US006197141B1

(12) United States Patent
Madsen

(10) Patent No.: US 6,197,141 B1
(45) Date of Patent: Mar. 6, 2001

(54) PROCESS OF APPLYING FILAMENT NETTING FOR PEST CONTROL OF VEGETATION

(76) Inventor: Kent M. Madsen, 3942 Sierra Hwy., Suite #6, Acton, CA (US) 93510

( * ) Notice: Subject to any disclaimer, the term of this patent is extended or adjusted under 35 U.S.C. 154(b) by 0 days.

(21) Appl. No.: 09/209,646

(22) Filed: Dec. 10, 1998

Related U.S. Application Data

(60) Provisional application No. 60/069,094, filed on Dec. 11, 1997.

(51) Int. Cl.[7] ................................................... A01G 13/02
(52) U.S. Cl. .............................. 156/167; 156/296; 47/26; 47/28.1; 47/31; 47/58.1
(58) Field of Search .................................. 156/167; 47/2, 47/28.1, 26, 31, 58.1, 296

(56) References Cited

U.S. PATENT DOCUMENTS

| | | | |
|---|---|---|---|
| 3,669,898 | * | 6/1972 | Butler ........................................ 47/2 |
| 3,787,265 | * | 1/1974 | McGinnis et al. ................... 156/167 |
| 5,500,220 | * | 3/1996 | Roe et al. ............................... 252/88 |
| 5,575,111 | * | 11/1996 | Rajamannan ......................... 47/58.1 |
| 6,052,943 | * | 4/2000 | Hoffmann et al. ................... 47/58.1 |

* cited by examiner

Primary Examiner—Jeff H. Aftergut
(74) Attorney, Agent, or Firm—Roger A. Marrs

(57) ABSTRACT

A liquid chemical spray, such as cellulose acetate or thermoplastic material, is discharged, under pressure, from an applicator wherein the liquid chemical is such that a plurality of elongated fibers or filaments are discharged to form an airborne netting of open mesh having a characteristic of light weight so as to float by gravitational force over a large area of vegetation. The formed netting cures in open air as it floats or settles on top of the foliage intended to be protected. The composition being discharged includes a low contact adhesive agent or substance which permits a clinging contact with the leaves of the foliage as the netting settles over the vegetation canopy. The fiber or filaments discharged from the applicator form a long continuous thread-like filament or an array of threads that impede the ingress of birds, insects, or the like. The liquid chemical may include coloring agents so as to visibly mimic the color of a natural characteristic to discourage the forage of birds into vines, trees or the like that would normally eat or damage fruits.

1 Claim, 1 Drawing Sheet

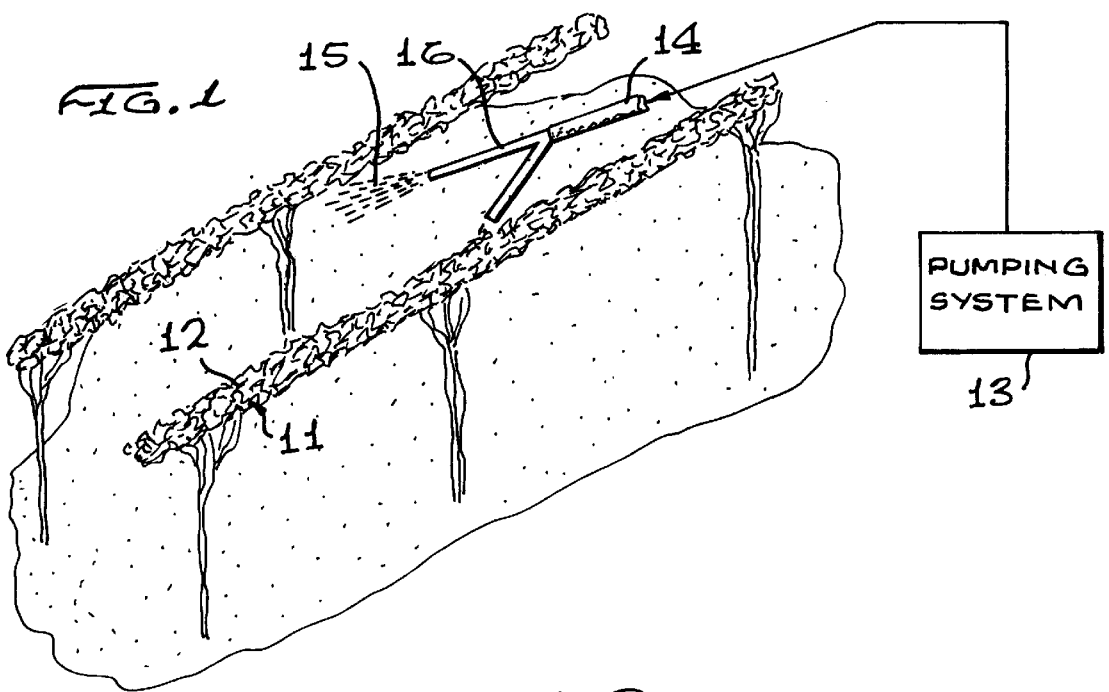
FIG. 1
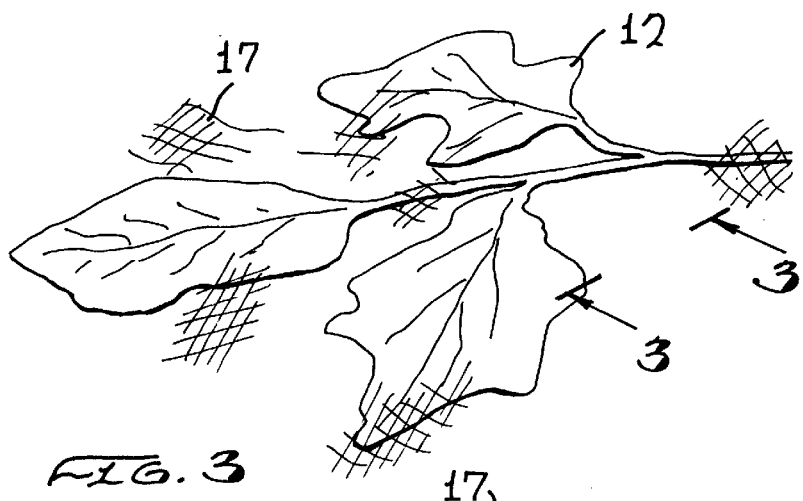
FIG. 2
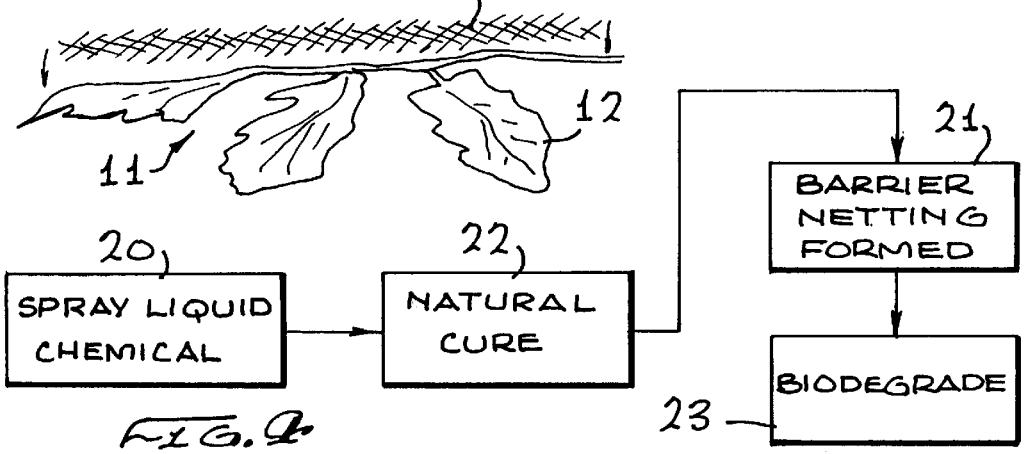
FIG. 3
FIG. 4

PROCESS OF APPLYING FILAMENT NETTING FOR PEST CONTROL OF VEGETATION

This application claims the benefit of U.S. Provisional Application Ser. No. 60/069,094 filed Dec. 11, 1997.

BACKGROUND OF THE INVENTION

1. Field of the Invention

The present invention relates to the field of vegetation protection, and more particularly to a novel netting of fibers or filament strands that may be readily discharged from a pressurized applicator so as to float over a canopy of foliage intended to be protected, and which includes low contact adhesion to the foliage.

2. Brief Description of the Prior Art

The control of bird and insect damage to foliage, such as grapes or orchard products, is difficult. Several attempts have been made in the past to prevent such damage by placing sheets or layers of plastic netting over the vegetation area intended to be protected. A major disadvantage of employing conventional netting is the extensive labor involved as well as the cost of the netting. In particular, removal of the netting is extremely time-consuming and is more of a problem than the original placement of the netting on the vegetation.

Some attempts have been made to provide a covering for the vegetation and one such attempt in disclosed in U.S. Pat. No. 5,251,398 which suggests the use of cellulosic fibers that may be used for protection of vegetation. However, it is noted that the protection is only for frost or freeze and that the coating is applied in either sheet or foam form. No suggestion is made that a "netting" can be employed which is composed of acetate fibers or filaments so as to permit passage of air and sunlight for promoting vegetation growth. Furthermore, there is no mention in the disclosure of how the foam or sheets are applied to the vegetation and it appears that the material is stored in large containers and that other materials such as non-cellulosic material can be used. Such materials mentioned are aluminum flakes or film-forming polymers such as ethyl cellulose. Although spraying techniques are used for applying ground fibers, the fibers are partially hydrated by the addition of a water mist from one or more water jets aimed at the path of the ejected fibers. The resulting hydrating spray contains sufficient water soluble adhesive to bond the fibers to the foliage such as trees.

Another attempt to provide vegetation protection is disclosed in the U.S. Pat. No. 4,169,902 which relates solely to the repelling of animals or birds and employs a latex composition. Additionally, U.S. Pat. No. 2,203,274 discloses a coating which is intended for repelling dogs, animals or rodents that is applied directly to the foliage or vegetation surface. This, however, is not related to a netting of cellulose acetate fibers that are formed in a filament for gravitational application to the tops of the vegetation. Regarding the U.S. Pat. No. 2,128,973, it is noted that the disclosure relates to coating agents which are applied directly to the surface areas of the vegetation and are not related to the employment or creation of netting or a filament or open mesh structure.

Therefore, a long-standing need has existed to provide a means for controlling pests such as insects or birds from damaging orchards and vineyards that may be sprayed over the vegetation area and which forms fibers or filaments constituting an open mesh netting that will deposit via gravitational forces over a large area of foliage. Such a means and application should be of low labor intensity and should be convenient to use without technical knowledge or skill.

SUMMARY OF THE INVENTION

Accordingly, the above problems and difficulties are avoided by the present invention which provides a novel liquid chemical spray, such as cellulose acetate, that may be discharged, under pressure, from a hand-held applicator. The consistency of the liquid chemical is such that a plurality of elongated fibers or filaments are discharged from the applicator so as to form an airborne netting of open mesh and having a characteristic of light weight so as to float by gravitational force over a large area of vegetation. The formed netting cures in open air as it floats or settles on top of the foliage intended to be protected. The composition of the substance being discharged includes a low contact adhesive agent or substance which permits a clinging contact with the leaves of the foliage as the netting settles over the vegetation canopy. The fiber or filaments discharged from the applicator form a long continuous thread-like filament or an array of threads that impede the ingress of birds, insects or the like. The composition of the liquid chemical may include coloring agents so as to visibly mimic the color of a natural characteristic so as to discourage the forage of birds into vines, trees or the like that would normally eat or damage fruits.

Therefore, it is among the primary objects of the present invention to provide a novel pest control for orchards and vineyards which employs a cellulose acetate or a similar substitute which is of the same basic material as the vegetation intended to be protected and to apply such a material or substance over a vegetation area intended to be protected in the form of a netting.

Another object of the present invention is to provide a novel pest control for vegetation which employs a basic material or substance which is similar to that of the composition of the vegetation and which applies this substance or material in the form of fibers and filaments to provide an open mesh netting that employs gravitational forces to settle the netting directly onto the foliage.

Still a further object of the present invention is to provide a netting composed of filaments or fibers which are produced from a composition which is degradable sooner than the detritus from the plants which are intended to be covered since the diameter of the fibers or filaments is much smaller and the very low bulk of material or substance such as cellulose aids degrading. Therefore, cleanup or removal is minimal.

Yet another object of the present invention is to provide a manually actuated pressure appliance for discharging a biodegradable substance in the form of filaments constituting an open mesh netting which floats into contact with vegetation so as to resist ingress of insects or birds which would normally destroy or damage the vegetation.

Still a further object of the present invention is to provide such a substance for an open mesh netting that is sticky in nature when the fibers are initially sprayed over the vegetation so that the formed netting will stick to the vegetation and the unstuck portion would then have time for curing and the unstuck portion would then stick to the feet and wings of birds attempting to light on the vegetation. Birds abhor having anything sticking to them, and they would immediately fly off.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a diagrammatic view, in perspective, illustrating the pest control system of the present invention for protecting an area of vegetation;

FIG. 2 is a greatly enlarged fragmentary perspective view showing foliage covered by netting produced in accordance with the inventive concept;

FIG. 3 is a cross-sectional view of the vegetation and netting shown in FIG. 2 as taken in the direction of arrows 3—3 thereof; and FIG. 4 is a block diagram showing the steps in producing the netting utilized in FIGS. 2 and 3.

DESCRIPTION OF THE PREFERRED EMBODIMENT

Referring to FIG. 1, the novel pest control means of the present invention is illustrated in the general direction of arrow 10 for protecting an area of foliage represented by numeral 11, which may be a vineyard, orchard or the like. The foliage includes a plurality of leaves, such as a leaf 12, and it is the plurality of the leaves or foliage that requires protection from intrusion by insects, birds, bugs or other flying pests.

In accordance with the inventive concept, the pumping system 13 is provided for pressurizing an applicator 14 for discharging a composition or substance 15 that is directed over the foliage 11. The substance or solution 15 is characterized as a viscous solution of a substance such as cellulose acetate which may be dissolved in a suitable solute, such as acetone through fine discharge orifices in the end of a long portable wand 16 of the applicator 14. The applicator may be hand-held or may be carried on a mechanized vehicle. The applicator 14 and the discharge wand 16 may be directed to discharge the substance 15 over the vegetation 11 and the discharge is in the form of filaments or fibers so that as the wand is moved or circled over the foliage, the filaments or fibers form a netting in the air and settle via gravity onto the tops of the vegetation. The filaments or fibers commence to cure as settling of the netting over the vegetation takes place. The basic material of the trees or arbors is reflected in similar characteristics for the substance 15 so that the substance is degradable in the same fashion as the vegetation over which it is settled.

The substance can be colored and will be sticky in nature so that it will cling to the surface of the vegetation.

Referring now in detail to FIG. 2, it can be seen that the netting is indicated by numeral 17 and that it is of an open mesh characteristic. The netting 17 clings to the leaf, such as leaf 12, and covers the exposed area between the leaves, twigs and branches so as to resist intrusion by pests and birds. It is intended that the netting restrict passage of flying pests as opposed to ground pests. The netting is degradable in a time period sooner than the detritus from the plants because of the small diameter of the filaments or fibers and the very low bulk of material that requires degrading.

In FIG. 3, it can be seen that the netting 17 is formed in the ambient air immediately over or above the vegetation 11 and that the netting settles on the top of the vegetation via gravitational forces. The netting is of an open mesh so that air and sunlight can pass through to augment the growth of the vegetation.

Referring now in detail to FIG. 4, the method of applying comprises spraying 20 with a liquid chemical such as cellulose acetate that includes a sticky substance and may include coloring if desired. The spray is directed over the top of the foliage so that a netting is formed in step 21 and curing occurs while in the air, as indicated by step 22. Settling on top of the vegetation 11 further promotes curing in the open air and clinging characteristics to the leaves when touching with the leaf. Removal or disposal of the netting is provided by the biodegradable nature 23 of the substance.

The inventive concept replaces conventional sheet netting technology and employs a mechanism 13 which consists of a high pressure, portable pump, gear or vane driven, that forces a viscous solution 15 of a substance, such as cellulose acetate, which may be dissolved in a solute-like acetone through fine orifices or spinnerets in the end of the portable wand. The portable wand may be hand-held or may be carried on a vehicle and the wand is capable of forming a long continuous strand or thread or an array of threads that are sprayed over the foliage needed to impede the ingress of pests. The sprayed netting can be colored brightly by addition of coloring agents to the substance so that the netting is visible or may be employed to camouflage or mimic the color of fire to discourage the forays of birds into the foliage which would cause damage.

The advantage of this inventive concept over current netting technology is that cellulose acetate or a suitable substitute is the same basic material as the trees or arbors. At the end of the season, the strands or filaments become similar to the dropped leaves and pruned canes of the vines as to their biodegradability. This "netting" would, in fact, degrade much sooner than the detritus from the plants because of the very small diameter of the fibers and the very low bulk of cellulose that needs degrading. Cleanup would be minimal to none. This is also an advantage over the "tape" of bi-colored plastic material currently in use to scare away birds. This type of material breaks away after much wind activity and is a cleanup hazard. The fibers proposed in this inventive concept would be so innocuous as to have no meaningful impact on surrounding property. Because of the sticky nature of the fibers when they are first "sprayed" out over the vines or trees, they would stick to whatever they first touch, the unstuck portion then having time to dry hard.

A variation which could be made would be to alter the spinneret head to force the fibers through a small amount of a permanently sticky substance which would stick to the outside of the fiber, and remain sticky after the fiber is in place and cured hard. This sticky substance would be like the rosin, rosin oil, castor oil mixture used in fly paper, or a modern substitute that is equally biodegradable and inexpensive. This would be an artificial "spider-web," nature's most effect insect trap. Also, animals have an aversion to having something stuck on their feet or wings. Exposure to these sticky fibers would not harm a bird or an animal but it would likely frighten them from pursuing the exploitation of the fruit. Sticky web barriers could be sprayed close to the base of vines or trees to discourage rabbits and ground squirrels. The fibers would stick to their feet when they attempt to climb the tree or eat the vine. After a period of time, like several months, the stickiness would be lost to dust and heat from the sun and the fibers would be relatively innocuous to harvesting personnel. No hazard whatever to humans or harvesting equipment is experienced and no permanent damage would occur to animals.

Another variation of this concept is to have an application system that has a larger number of smaller spinnerets that can lay down a simulated "spider web" over the tops of grape vine canopies. The web would then receive a spray-over of sticky rosin substance described above. This would create a biodegradable trap for leaf hoppers, sharp-shooters, and other leaf insects that infest grapes or orchards.

A disadvantage to using a solvent based solution such as cellulose acetate in acetone, is that time is required after the spraying out of the netting for drying to take place. The application of the sticky phase (i.e. the rosin/rosinol or similar sticky material) of the procedure cannot take place until the fibers are sufficiently dry to resist the application of the sticky material.

A variation which has considerable merit in this regard would be to use a thermoplastic material for the underlying netting. Because of the small diameter of the fibers produced for this procedure, cooling would occur almost instantaneously after leaving the spinnerets. This provides more control as to placement of the netting, as well as the opportunity to apply the sticky phase of the procedure at the same time as the application of the netting.

Because of the cooling, and thus solidification of a thermoplastic material occurring shortly after leaving the spinnerets, the spray device can be coupled with the sticky-material application at almost the same time the netting leaves the spray head and before it lands on the vines or other target plants. Very small spray heads for the sticky material would be built just outside the spinnerets. The sticky material has a solvent to lower viscosity prior to use. The heat contained in the target fibers would act to drive off the solvent. The cooling action of the solvent serves to lower the temperature of the fibers, thus having a mutually beneficial result.

A material which is bio-degradable like the solvent based cellulose acetate, is a polyester material manufactured by DuPont Corp. called Biomax®. Other similar bio-degradable thermoplastic materials may be available which are suitable to a low temperature spray device applicable to this procedure. The characteristics of the thermoplastic material would be similar to the adhesive sticks available in wide-spread use for heated glue-guns. Most glue gun materials, however, are not bio-degradable and thus would prevent an environmental hazard in this use.

The application device would consist of a tractor-mounted platform containing a heated storage pot for the thermoplastic material, a small gear pump to move the material, several internally heated hoses leading to heated spray arms of the device which would be situated about a foot or so above the tops of the vines, or outside the perimeter of trees. After a suitable warm-up period to liquefy the thermoplastic material in the pot, hoses, and spray heads, the device would be carried down a row of vines or trees or other plants, with the operator activating the spray-heads to make netting where desired with suitable valves built into the device. Energy for the heating of hoses, spray heads and pumping would be obtained from the tractor's electrical system. The main heating would likely require a small propane burner built beneath the main storage pot.

An additional use of the sticky-netting device would be to place, at the periphery of a vineyard, orchard, or farm field, where not needed by field workers, a wide band (1–3 feet wide) of the sticky netting on top of weeds, rocks, or whatever exists in the unused areas surrounding a productive field. Gophers, rabbits, and ground squirrels would find the netting sticks to their feet and would be reluctant to try to cross the protective area. No environmental damage would occur as the material would disintegrate and compost during the post-harvest period leaving the area unaffected the following year. No cleanup would be necessary. A layer of the sticky netting can be sprayed at the base of trees and vines to prevent ground squirrels and other rodents from reaching or climbing the trees or vines.

Another use would be to erect periodic poles with supporting twine or wires between them to support a small vertical wall of the sticky net between the rows of crops which do not lend themselves to direct application of the sticky net. This would entrap insects traveling from one row to another. Replacement yearly would be a very simple task.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A method of covering vegetation against bird, insect or animal intrusion comprising the steps of:

preparing a non-toxic liquid chemical composition adapted to provide elongated filaments so as to provide an airborne netting of open mesh having the characteristic of light weight for floating and disposition over a target area of vegetation by gravitational force;

said step of preparing liquid chemical composition includes the step of including a low contact adhesive agent permitting a clinging contact with the target area of vegetation and further the step of including a coloring agent to visibly mimic the color of natural vegetation;

discharging of said prepared liquid chemical composition under pressure from a pressurized hand-held applicator in long, continuous filaments and in the direction of the target area of vegetation whereby said discharged liquid chemical composition settles in contacting engagement with the target area of vegetation;

allowing said discharged liquid chemical composition to cure into a hardened array of open-mesh filaments clinging to the target area of vegetation;

said step of discharging the liquid chemical composition includes the step of creating the airborne netting by:
 a. forcing the liquid chemical composition through spinnerets in a spray device, or
 b. blowing nitrogen across the end of a supply pipe with the liquid chemical composition oozing into a jet stream;

said preparing step includes the step of selecting the liquid chemical composition from the following:
 a. thermoplastic materials, or
 b. cellulose acetate.

* * * * *